United States Patent
Taki et al.

(10) Patent No.: US 9,866,048 B2
(45) Date of Patent: Jan. 9, 2018

(54) FEEDING DEVICE

(71) Applicant: Kabushiki Kaisha Toshiba, Tokyo (JP)

(72) Inventors: Kinji Taki, Ome (JP); Tooru Mamata, Akiruno (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 388 days.

(21) Appl. No.: 14/581,960

(22) Filed: Dec. 23, 2014

(65) Prior Publication Data

US 2015/0207363 A1    Jul. 23, 2015

Related U.S. Application Data

(60) Provisional application No. 61/930,863, filed on Jan. 23, 2014.

(51) Int. Cl.
*H02J 7/00* (2006.01)
*H02J 7/02* (2016.01)
*H02J 50/12* (2016.01)

(52) U.S. Cl.
CPC .......... *H02J 7/0055* (2013.01); *H02J 7/025* (2013.01); *H02J 50/12* (2016.02); *H02J 7/0042* (2013.01)

(58) Field of Classification Search
CPC ........... H02J 7/025; H02J 5/005; H02J 7/0042
USPC .................................................. 307/66, 104
See application file for complete search history.

(56) References Cited

U.S. PATENT DOCUMENTS

| | | | |
|---|---|---|---|
| 2007/0182367 A1* | 8/2007 | Partovi .................. | H01F 5/003 320/108 |
| 2010/0013432 A1* | 1/2010 | Toya ..................... | H02J 7/0027 320/108 |
| 2011/0164471 A1* | 7/2011 | Baarman ................ | H02J 7/025 368/10 |
| 2011/0307732 A1 | 12/2011 | Furusho et al. | |
| 2013/0026984 A1* | 1/2013 | Yamamoto ............. | H02J 7/025 320/108 |
| 2013/0328399 A1* | 12/2013 | Suzuki .................. | G06F 1/1654 307/29 |
| 2014/0151079 A1* | 6/2014 | Furui ....................... | B25F 5/02 173/46 |

FOREIGN PATENT DOCUMENTS

| | | |
|---|---|---|
| JP | 2010-068639 | 3/2010 |
| JP | 2011-259625 | 12/2011 |
| JP | 2012-095435 | 5/2012 |
| JP | 2013-130828 | 7/2013 |

* cited by examiner

*Primary Examiner* — Jared Fureman
*Assistant Examiner* — Alfonso Perez Borroto
(74) *Attorney, Agent, or Firm* — Rutan & Tucker, LLP

(57) ABSTRACT

An electric power is fed from a wireless feeding device to a feeding device, and the feeding device feeds the electric power to an object to which the electric power is fed. The feeding device includes a power receiving module, a power circuit and a controller. The power receiving module receives the electric power from the wireless feeding device. The electric power is fed from the power receiving module or from an AC adapter to the power circuit and the power circuit feeds the electric power to the object to which the electric power is fed. The controller interrupts a supply of the electric power from the AC adapter.

4 Claims, 5 Drawing Sheets

FEEDING DEVICE

CROSS-REFERENCE TO RELATED APPLICATION

This application claims priority from U.S. Provisional Patent Application No. 61/930,863 filed on Jan. 23, 2014, the entire contents of which are incorporated herein by reference.

FIELD

An embodiment of the present invention relates to a feeding device.

BACKGROUND

As an electric power feeding function to a note PC (a personal computer) or a tablet, a wireless feeding function is studied. However, in the note PC or the tablet, a feeding line from an AC adapter is already provided. When a wireless feeding device is connected at the same time, the feeding line from the AC adapter of the note PC side is ordinarily allowed to have preference thereto. However, depending on a state of a battery of the note PC side, a control of using a feeding line of the wireless feeding device side is necessary.

An attempt that the wireless feeding function is to be mounted is in a state of a starting period and has problems of controls for the feeding line depending on conditions such as when the wireless feeding device and the AC adapter are connected at the same time, a state of the battery or a sudden disconnection when only the wireless feeding device is connected.

DETAILED DESCRIPTION

According to one embodiment, an electric power is fed from a wireless feeding device to a feeding device, and the feeding device feeds the electric power to an object to which the electric power is fed. The feeding device includes a power receiving module, a power circuit and a controller. The power receiving module receives the electric power from the wireless feeding device. The electric power is fed from the power receiving module or from an AC adapter to the power circuit and the power circuit feeds the electric power to the object to which the electric power is fed. The controller interrupts a supply of the electric power from the AC adapter.

Various Embodiments will be described hereinafter with reference to the accompanying drawings.

Now, an embodiment will be described below by referring to FIG. 1 to FIG. 5.

Initially, by referring to FIG. 1 to FIG. 2, an entire structure of an electronic device according to one embodiment of an information device will be described below. The electronic device may be realized as, for instance, a notebook type portable personal computer, a tablet terminal or other various kinds of information processors.

Figure 1:
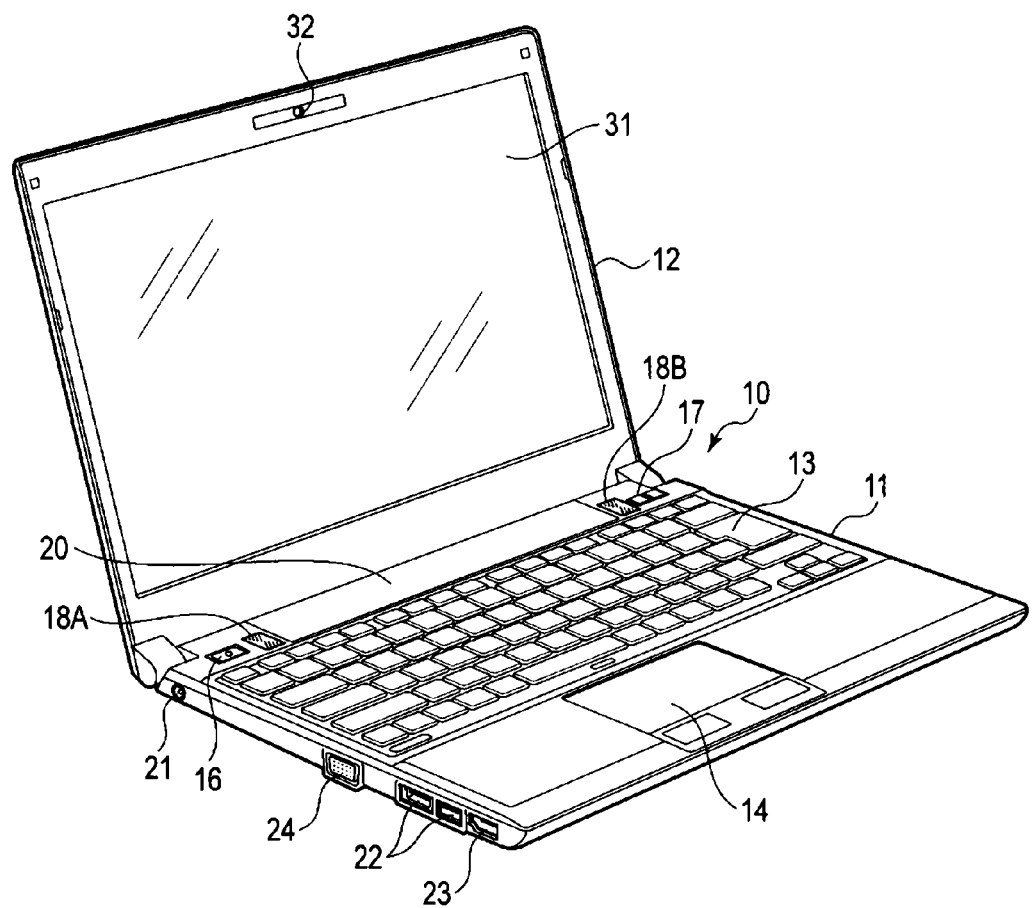
FIG. 1 is a perspective view showing one example of an external appearance of an electronic device of an embodiment.

FIG. 1 is a perspective view showing a notebook type computer 10 with a display unit opened from a front surface side. This computer 10 is formed so as to receive an electric power from a battery 20. The computer 10 includes a computer main body 11 and a display unit 12. In the display unit 12, a display device such as a liquid crystal display device (LCD) 31 is incorporated. Further, in an upper end part of the display unit 12, a camera (a Web camera) 32 is arranged.

The display unit 12 is attached to the computer main body 11 so as to freely rotate between an opening position where an upper surface of the computer main body 11 is exposed and a closing position where the upper surface of the computer main body 11 is covered with the display unit 12. The computer main body 11 has a thin box shaped casing. On the upper surface thereof, are arranged a keyboard 13, a touch pad 14, a power switch 16 for switching on/off the computer 10, some functional buttons 17 and speakers 18A and 18B.

Further, in the computer main body 11, a power connector 21 is provided. The power connector 21 is provided in a side surface of the computer main body 11, for instance, a left side surface. To the power connector 21, an external power device is detachably connected. As the external power device, an AC adapter can be used. The AC adapter is a power device which converts a commercial power (an AC electric power) into a DC electric power.

The battery 20 is detachably attached to, for instance, a rear end part of the computer main body 11. The battery 20 may be a battery built in the computer 10.

The computer 10 is driven by the electric power from the external power device or the electric power from the battery 20. When the external power device is connected to the power connector 21 of the computer 10, the computer 10 is driven by the electric power from the external power device. Further, the electric power from the external power device is also used to charge the battery 20. During a period when the external power device is not connected to the power connector 21 of the computer 10, the computer 10 is driven by the electric power from the battery 20.

Further, in the computer main body 11, some USB ports 22, an HDMI (a High-Definition Multimedia Interface) output terminal 23 and an RGB port 24 are provided.

Figure 2:
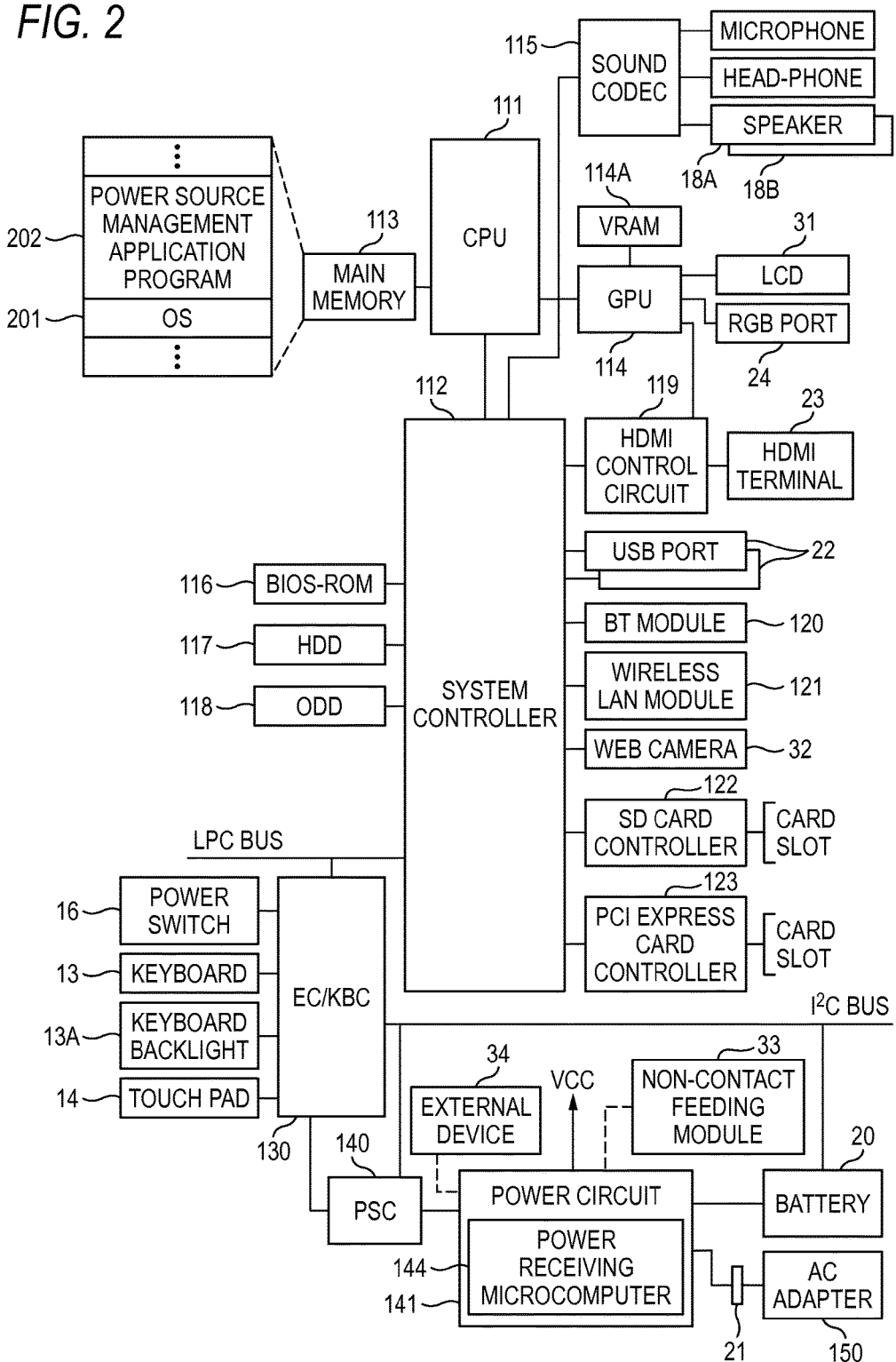
FIG. 2 is a block diagram showing one example of a system structure of the electronic device of the embodiment.

FIG. 2 shows a system (an object to which an electric power is fed) structure of the computer 10. The computer 10 includes a CPU 111, a system controller 112, a main memory 113, a graphics processing unit (GPU) 114, a sound CODEC 115, a BIOS-ROM 116, a hard disk drive (HDD) 117, an optical disk drive (ODD) 118, a BT (Bluetooth (a registered trademark)) module 120, a wireless LAN module 121, an SD card controller 122, a PCI EXPRESS card controller 123, an embedded controller/keyboard controller IC (EC/KBC) 130, a keyboard backlight 13A, a power source controller (PSC) 140 and a power circuit 141.

The CPU 111 is a processor which controls operations of components of the computer 10 respectively. The CPU 111 executes various kinds of software loaded in the main memory 113 from the HDD 117. The software includes an operating system (OS) 201, a power source management application program 202 whose explanation is omitted and various kinds of application programs 203. The various kinds of application programs 203 include applications of the above-described desk top system and an entire screen system. The CPU 111 is the processor which controls respectively the operations of the components of the personal computer 10. The CPU 111 executes various kinds of programs loaded in the main memory 113 from the HDD 117. The programs include the operating system (OS) 201 and the various kinds of application programs. The application programs include the power source management application program 202. The power source management application program 202 is a program which realizes a peak shift function. The peak shift function is a function for reducing a consumption of the electric power (a consumption of the electric power by driving an AC power) during a time zone when a demand for the electric power is high.

Further, the CPU 111 also executes a basic input and output system (BIOS) stored in the BIOS-ROM 116 as a nonvolatile memory. The BIOS is a system program for controlling hardware.

The GPU 114 is a display controller which controls the LCD 31 used as a display monitor of the computer 10. The GPU 114 generates a display signal (an LVDS signal) to be supplied to the LCD 31 from display data stored in a video memory (a VRAM) 114A. Further, the GPU 114 can generate an analog RGB signal and an HDMI video signal from the display data. The analog RGB signal is supplied to an external display through the RGB port 24. The HDMI output terminal 23 can transmit the HDMI video signal (a non-compressed digital video signal) and a digital audio signal to the external display by one cable. An HDMI control circuit 119 is an interface which transmits the HDMI video signal and the digital audio signal to the external display through the HDMI output terminal 23.

The system controller 112 is a bridge device which connects the CPU 111 to the components respectively. The system controller 112 incorporates therein a serial ATA controller for controlling the hard disk drive (HDD) 117 and the optical disk drive (ODD) 118. Further, the system controller 112 communicates with devices respectively on an LPC (a Low PIN Count) bus.

The EC/KBC 130 is connected to the LPC bus. The EC/KBC 130, the power source controller (PSC) 140 and the battery 20 are mutually connected through a serial bus such as an $I^2C$ bus.

The EC/KBC 130 is an electric power management controller which manages an electric power of the computer 10 and is realized as, for instance, a one-chip microcomputer which incorporates therein a keyboard controller for controlling the keyboard (KB) 13 and the touch pad 14. The EC/KBC 130 has a function for switching on and switching off the computer 10 in accordance with an operation of the power switch 16 by a user. A control for switching on and switching off the computer 10 is carried out by a cooperating operation of the EC/KBC 130 and the power source controller (PSC) 140. The power source controller (PSC) 140 monitors a supply of power (charge and discharge) to the components respectively and the battery 20 or a charging state (a charging capacity (voltage)) of the battery 20. When the power source controller (PSC) 140 receives an ON signal transmitted from the EC/KBC 130, the power source controller (PSC) 140 controls the power circuit 141 to switch on the computer 10. Further, when the power source controller (PSC) 140 receives an OFF signal transmitted from the EC/KBC 130, the power source controller (PSC) 140 controls the power circuit 141 to switch off the computer 10. The EC/KBC 130, the power source controller (PSC) 140 and the power circuit 141 are operated by an electric power from the battery 20 or an AC adapter 150 during a period when the computer 10 is turned off.

Further, the EC/KBC 130 can turn on/off the keyboard backlight 13A arranged in a rear surface of the keyboard 13. Further, the EC/KBC 130 is connected to a panel opening and closing switch 131 formed so as to detect opening and closing operations of the display unit 12. Even when the opening operation of the display unit 12 is detected by the panel opening and closing switch 131, the EC/KBC 130 can switch on the computer 10.

The control of the computer 10 to be switched on/switched off is carried out by the cooperating operation of the EC/KBC 130 and the power circuit 141.

The power circuit 141 receives a supply of power from the battery 20 attached to the computer main body 11 or an external power source connected through the AC adapter 150 to generate an operating power and supply the operating power to the components respectively. In the power circuit 141, a power receiving microcomputer 144 is provided. When the battery 20 and the AC adapter 150 are connected thereto, the power circuit 141 charges the battery 20 by the external power source.

The power circuit 141 uses the electric power from the battery 20 or the electric power from the AC adapter 150 connected to the computer main body 11 as the external power source to generate the electric power (the operating power) to be supplied to the components respectively. The power circuit 141 also receives the electric power from a non-contact feeding module 33 by, for instance, an electromagnetic induction system and obtains a DC voltage in a circuit not shown in the drawing. This circuit is, for instance, a high frequency power source in which the non-contact feeding module 33 outputs an AC constant current. The circuit includes a pickup coil wound on a pickup core close to a feeding line to which a high frequency current is supplied when the constant current is supplied to the feeding line connected to the high frequency power source, a resonance capacitor connected in parallel with the pickup coil, a rectifying part using a diode bridge connected in parallel with the resonance capacitor and a constant voltage circuit which controls a current outputted by the rectifying part to a prescribed voltage.

Figure 3:
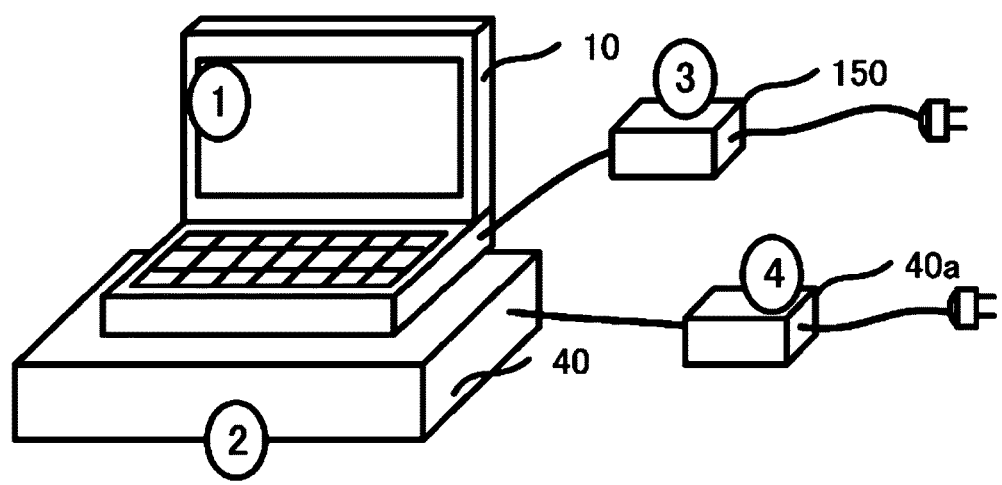
FIG. 3 is a block diagram showing a mounting example of an entire part of the embodiment.
Figure 4:
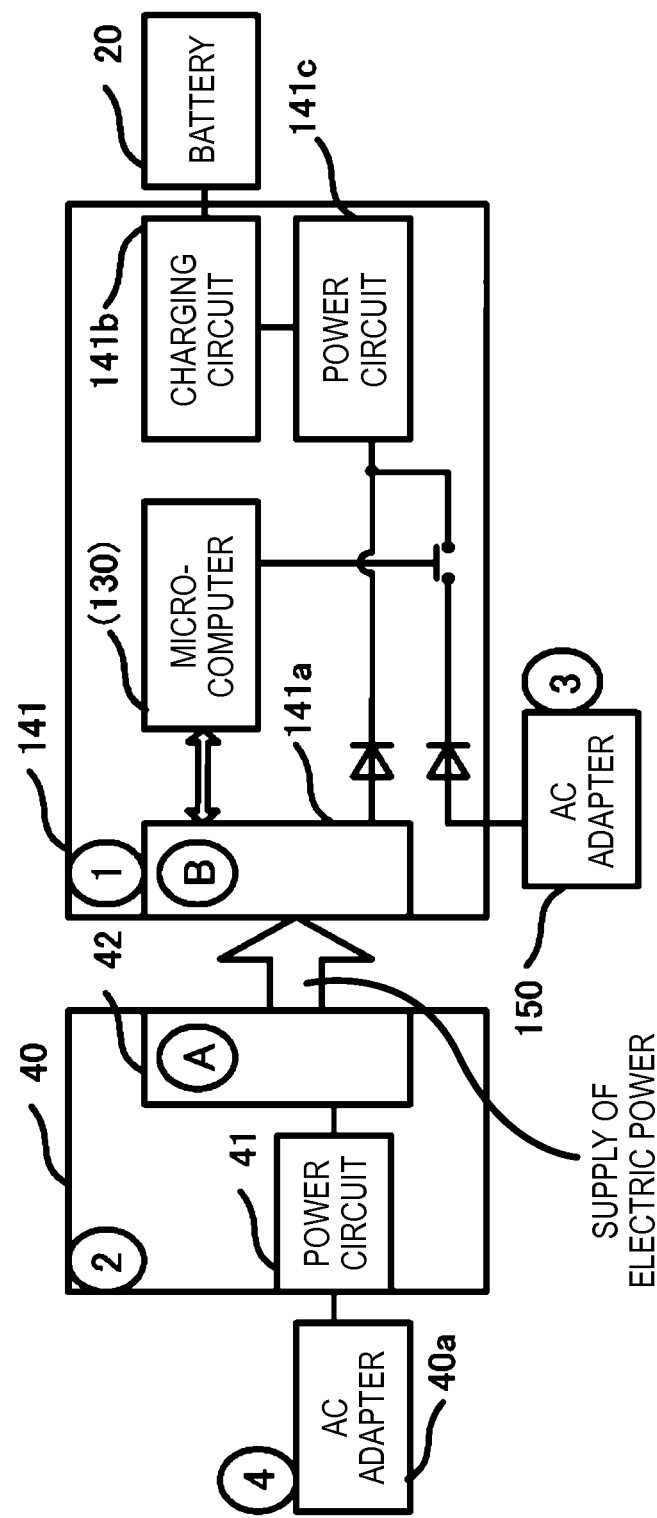
FIG. 4 is a functional block diagram of an inner circuit of the embodiment.

FIG. 3 is a block diagram showing a mounting example of an entire part of the embodiment. FIG. 4 is a functional block diagram of an inner circuit of the embodiment.

The note PC (the computer 10) incorporates therein a power receiving device 141a. In the power receiving device 141a, the power receiving microcomputer 144 is included. The electric power is supplied to the note PC from a wireless feeding device 40 (the non-contact feeding module 33) and the AC adapter 150. In addition thereto, the electric power can be also supplied from the incorporated battery 20. The power circuit 141 (a feeding device which receives a support of a below-described microcomputer as a function) is formed so as to supply the electric power to the incorporated (or does not need to be incorporated) battery 20 as well as the components respectively in the note PC as objects to which the electric power is supplied through a power circuit 141c and a charging circuit 141b.

The wireless feeding device 40 has a structure which includes a power transmitting device 42 of the wireless feeding device and uses an AC adapter 40a and a power circuit 41 to transmit the electric power. The power transmitting device 42 supplies the electric power to the power receiving device 141a as a power receiving unit through a circuit (a transmitting part) not shown in the drawing by, for instance, the electromagnetic induction system. The power receiving device 141*a* obtains the DC voltage. This transmitting part is what is called a circuit showing a structure of the non-contact feeding device. The circuit has, for instance, the feeding line connected to the high frequency power source which outputs the AC constant current. For instance, the pickup coil mounted on the power receiving device 141*a* is arranged closely to the feeding line so that the electric power may be supplied.

In the note PC, is provided the microcomputer (a function of the EC/KBC 130) which can detect whether or not the AC adapter 150 exists (whether or not the electric power is supplied). The microcomputer can communicate with the power receiving microcomputer 144 in the power receiving device 141*a* mounted in the note PC. Further, this microcomputer can interrupt the supply of the electric power from the AC adapter 150 by using a switch as a controller as shown in FIG. 4.

Figure 5:
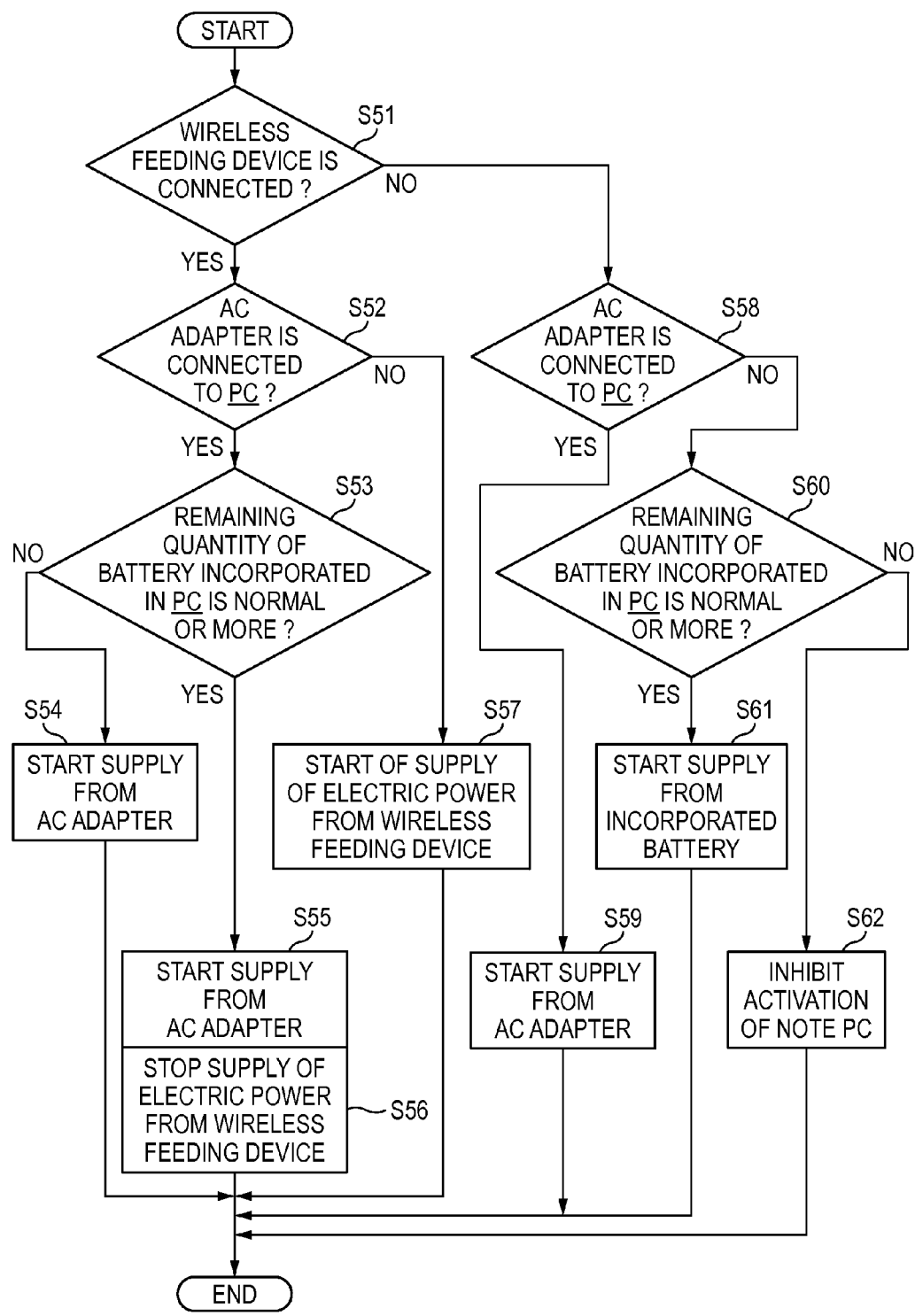
FIG. 5 is a flowchart for switching a feeding line used in the embodiment.

FIG. 5 is a flowchart for switching the feeding line used in the embodiment. A summary and an explanation of a flow will be described below.

(1) The microcomputer in the note PC obtains a connecting state and a feeding state of the power transmitting device 42 from the power receiving device 141*a*.

(2) When the wireless feeding device 40 is connected so that the electric power may be supplied, the power circuit 141 recognizes a connecting state of the AC adapter 150 of the note PC side and a charging state of the incorporated battery 20 and switches the feeding lines in accordance with below-described states.

(2a) When the AC adapter 150 is connected and a remaining quantity of the incorporated battery 20 is normal or more, the electric power is supplied from the AC adapter 150.

(2b) When the AC adapter 150 is not yet connected or the remaining quantity of the incorporated battery 20 is lower than normal, the electric power is supplied from the wireless power receiving device 141*a*.

(3) When the wireless feeding device 40 is not yet connected or when the electric power cannot be supplied, the feeding line is switched in accordance with below-described states.

(3a) When the AC adapter 150 is connected, the electric power is supplied from the AC adapter.

(3b) When the AC adapter 150 is not yet connected and the remaining quantity of the incorporated battery 20 is normal or more, the electric power is supplied from the incorporated battery.

(3c) When the AC adapter 150 is not yet connected and the remaining quantity of the incorporated battery 20 is lower than normal, the note PC is inhibited from being activated.

Step S51: The power source management application program 202 determines whether the wireless feeding device (the non-contact feeding module 33) is connected or is not yet connected. When the wireless feeding device is connected, the power source management application program 202 advances to a next step. When the wireless feeding device is not connected, the power source management application program skips to step S58.

Step S52: The power source management application program 202 determines whether the AC adapter 150 is connected or is not connected to the note PC. When the AC adapter is connected, the power source management application program 202 advances to a next step. When the AC adapter is not connected, the power source management application program skips to step S57.

Step S53: The power source management application program 202 determines whether the remaining quantity of the incorporated battery (the battery 20) of the note PC is normal or more, or lower than normal. When the remaining quantity of the incorporated battery is normal or more, the power source management application program 202 advances to step S55. When the remaining quantity of the incorporated battery is lower than normal, the power source management application program advances to step 54.

Step S54: The power source management application program 202 starts a supply of the electric power from the AC adapter 150 to finish a process.

Step S55: The power source management application program 202 starts a supply of the electric power from the AC adapter 150 and advances to a next step.

Step S56: The power source management application program 202 stops a supply of the electric power from the wireless feeding device and finishes a process.

Step S57: The power source management application program 202 starts a supply of the electric power from the wireless feeding device to finish a process.

Step S58: The power source management application program 202 determines whether the AC adapter 150 is connected or is not connected to the note PC. When the AC adapter is connected, the power source management application program 202 advances to a next step. When the AC adapter is not connected, the power source management application program skips to step S60.

Step S59: The power source management application program 202 starts a supply of the electric power from the AC adapter 150 and finishes a process.

Step S60: The power source management application program 202 determines whether the remaining quantity of the incorporated battery (the battery 20) of the note PC is normal or more, or lower than normal. When the remaining quantity of the incorporated battery is normal or more, the power source management application program 202 advances to step S61. When the remaining quantity of the incorporated battery is lower than normal, the power source management application program advances to step 62.

Step S61: The power source management application program 202 starts a supply of the electric power from the incorporated battery to finish a process.

Step S62: The power source management application program 202 inhibits (restrains) the note PC from being activated and finishes a process.

As described above, a technique is explained as the summary that the feeding line of the electric power is switched in accordance with a below-described basic principle of priority.

(1) A supply from the AC adapter of the note PC or a Docker has priority.

(2) When the remaining quantity of the battery is low, a supply from the wireless feeding device has priority.

The above-described embodiment relates to the note PC, however, the note PC may be replaced by a tablet PC or a Docker. Since the wireless feeding device is connected through a communication I/F by the microcomputer, the wireless feeding device can be used in the note PC or the tablet PC.

(Features of Embodiment)

(1) When the wireless feeding device and the AC adapter are connected at the same time, the AC adapter has priority thereto. On the basis of this principle, the feeding line is switched in accordance with an attachment and detachment of the wireless feeding device or a connecting state of the AC adapter. When the note PC is mounted on the wireless feeding device, if the AC adapter is connected to the note PC, the feeding line is switched to the AC adapter. When the AC adapter is not connected to the note PC, the feeding line is switched to the wireless feeding device. Further, while the electric power is supplied from the wireless feeding device, when the note PC is detached, the supply of the electric power from the wireless feeding device is interrupted to switch the feeding line to the incorporated battery in the note PC or the AC adapter.

(2) When the electric power is supplied to the note PC (the AC adapter is not connected) from the wireless feeding device, if the AC adapter is connected to the note PC, the feeding line is switched to the AC adapter from the wireless feeding device.

(3) When the electric power is supplied to the note PC from the AC adapter, if the AC adapter is pulled out, the feeding line is switched to the wireless feeding device.

(4) Even when the AC adapter is connected to the note PC, if the battery incorporated in the note PC is completely discharged or the battery is absent, the feeding line is set to the wireless feeding device.

(5) As a supplement, when the feeding lines have three systems like the wireless feeding device, the Docker and the note PC (or the tablet PC), a priority level is set in such way as a Docker side Ac adapter>a note PC side AC adapter>the wireless feeding device. The feeding line is switched in accordance with the priority level.

As a related art, there is a technique which switches paths in a main body when adapters having different rated capacities are connected to the same power feeding line. However, the present embodiment concerns a switching method as to which of power feeding lines is used for a plurality of power feeding lines that use the wireless feeding device. A difference resides in this point between the related art and the present embodiment.

As an effect of the embodiment in comparison with the related art, when the power receiving device is mounted not on the note PC, but on the Docker side, the power feeding lines of the three paths at maximum are assumed as described in the supplement. As described above, even when the power feeding lines are increased, the present embodiment can effectively and easily meet such a situation.

The present invention is not limited to the above-described embodiment and may be additionally and variously modified within a range which does not deviate from a gist thereof.

Further, when a plurality of component elements disclosed in the above-described embodiment is suitably combined together, various invention can be devised. For instance, some component elements may be deleted from all the component elements disclosed in the embodiment. Further, component elements of different embodiments may be suitably combined together.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control device comprising:
    a wireless feeding device configured to feed electric power to an electronic apparatus through wireless power connection;
    a battery provided in the electronic apparatus;
    a controller configured to determine whether (i) the wireless feeding device is connected, (ii) an AC adapter is connected to the electronic apparatus, (iii) a remaining quantity of the battery is greater than or equal to a first threshold that is less than full capacity of the battery, wherein the AC adapter is configured to feed electric power to the electronic apparatus via a coupling with an adapter terminal of the electronic apparatus; and
    a power circuit configured to feed electric power to a main part of the electronic apparatus,
    wherein the power circuit (i) feeds electric power from the AC adapter to the main part of the electronic apparatus when the wireless feeding device is connected and the AC adapter is connected, (ii) feeds electric power from the wireless feeding device to the main part of the electronic apparatus when the wireless feeding device is connected and the AC adapter is not connected, and (iii) responsive to determining (a) the remaining quantity of the battery is greater than or equal to the first threshold and (b) the AC adapter is connected to the electronic apparatus, stops feeding of the electric power from the wireless feeding device and feeds electric power to the main part of the electronic apparatus from the AC adapter.

2. The power control device according to claim 1, wherein, when the wireless feeding device is connected and the AC adapter is connected, and when the remaining quantity of the battery is lower than the first threshold, the power circuit feeds electric power from the AC adapter to the main part of the electronic apparatus without stopping feeding of the electric power from the wireless feeding device.

3. The power control device according to claim 1, wherein, when the wireless feeding device is not connected and the AC adapter is not connected, and when the remaining quantity of the battery is equal to or higher than a second threshold, the power circuit feeds electric power from the battery to the main part of the electronic apparatus.

4. The power control device according to claim 3, wherein, when the wireless feeding device is not connected and the AC adapter is not connected, and when the remaining quantity of the battery is lower than the second threshold, the power control device prevents activation of the main part of the electronic apparatus.

* * * * *